US011753336B2

(12) United States Patent
Toncelli

(10) Patent No.: US 11,753,336 B2
(45) Date of Patent: Sep. 12, 2023

(54) METHOD FOR MANUFACTURING ARTICLES IN THE FORM OF A SLAB OR BLOCK WITH A HARDENING BINDER, AND ARTICLES THUS OBTAINED

(71) Applicant: Luca Toncelli, Bassano del Grappa (IT)

(72) Inventor: Luca Toncelli, Bassano del Grappa (IT)

(*) Notice: Subject to any disclaimer, the term of this patent is extended or adjusted under 35 U.S.C. 154(b) by 473 days.

(21) Appl. No.: 16/603,875

(22) PCT Filed: Apr. 10, 2018

(86) PCT No.: PCT/IB2018/052483
§ 371 (c)(1),
(2) Date: Oct. 9, 2019

(87) PCT Pub. No.: WO2018/189663
PCT Pub. Date: Oct. 18, 2018

(65) Prior Publication Data
US 2020/0115278 A1 Apr. 16, 2020

(30) Foreign Application Priority Data

Apr. 11, 2017 (IT) .......................... 102017000040155
Feb. 23, 2018 (IT) .......................... 102018000003001

(51) Int. Cl.
*C04B 14/22* (2006.01)
*B29C 67/24* (2006.01)
*C04B 26/18* (2006.01)
*C04B 28/02* (2006.01)
*B29C 43/00* (2006.01)
*B29C 45/00* (2006.01)
*C04B 103/00* (2006.01)
*C04B 111/00* (2006.01)
*C04B 111/54* (2006.01)

(52) U.S. Cl.
CPC ............ *C04B 14/22* (2013.01); *B29C 43/003* (2013.01); *B29C 45/0001* (2013.01); *B29C 67/243* (2013.01); *B29C 67/244* (2013.01); *C04B 26/18* (2013.01); *C04B 28/02* (2013.01); *C04B 2103/0043* (2013.01); *C04B 2103/0075* (2013.01); *C04B 2111/00129* (2013.01); *C04B 2111/542* (2013.01)

(58) Field of Classification Search
CPC ... C04B 14/24; C04B 14/22; C04B 2111/542; B29C 67/243; B29C 67/244; B28B 3/20
See application file for complete search history.

(56) References Cited

U.S. PATENT DOCUMENTS

| 3,396,067 | A | * | 8/1968 | Schafer | ................. | B44F 9/04 |
| | | | | | | 523/521 |
| 5,164,425 | A | | 11/1992 | Uchida et al. | | |
| 5,976,441 | A | * | 11/1999 | Guyot | .................. | B28B 5/022 |
| | | | | | | 264/210.8 |
| 8,969,464 | B2 | | 3/2015 | Leblanc | | |
| 2004/0094863 | A1 | * | 5/2004 | Burge | ..................... | C04B 28/02 |
| | | | | | | 264/219 |
| 2007/0210493 | A1 | * | 9/2007 | Takahashi | ............. | C04B 35/565 |
| | | | | | | 501/80 |
| 2008/0006956 | A1 | * | 1/2008 | Toncelli | ................. | C04B 41/63 |
| | | | | | | 264/71 |
| 2015/0042006 | A1 | * | 2/2015 | Kager | .................... | B28B 1/005 |
| | | | | | | 425/371 |

FOREIGN PATENT DOCUMENTS

| CA | 2060041 C | 4/1999 |
| CN | 101570331 A | * 11/2009 |
| EP | 0493631 A1 | 7/1992 |
| EP | 1712583 B1 | 8/2005 |
| IT | 1056388 B | 1/1982 |
| IT | 1117346 B | 2/1986 |
| JP | H092858 A | 1/1997 |
| JP | H10507979 A | 8/1998 |
| KR | 20140095095 A | 7/2014 |
| WO | 0130719 A2 | 5/2001 |
| WO | 2006084827 A1 | 8/2006 |
| WO | 2006122892 A1 | 11/2006 |
| WO | 2011036623 A1 | 3/2011 |
| WO | 2017083671 A1 | 5/2017 |

OTHER PUBLICATIONS

Appendix D. [Retrieved from the web on Sep. 29, 2021 <URL: https://www.fhwa.dot.gov/publications/research/infrastructure/pavements/pccp/04150/appendd.cfm>] (Year: 2016).*
Ferro Frit Datasheet (Year: 2008).*
Digital Fire Oxide Database (Year: 2005).*
Hutchinson Cuff, Y., "Ceramic Technology for Potters and Sculptors," 1996, pp. 122-123.
PCT International Search Report and Written Opinion dated Jul. 31, 2018 for International Application No. PCT. IB2018-052483, from which the instant application is based, 12 pgs.
Database WPI, Week 199711, Thomson Scientific, London, GB; AN 1997-115130, X002776444, 2 pgs.
Posner, E., "Pneumoconiosis in makers of artificial grinding wheels, including a case of Caplan's syndrome," Brit. J. Industr. Med., 1960, 17, pp. 109-113.
PCT Third Party Observation dated Jun. 14, 2019 for Intl. App. No. PCT/IB2018/052483, 6 pgs.
The Editors of Encyclopaedia Britannica, Mohs hardness, Encyclopaedia Britannica, Oct. 5, 2016, 2 pages.

(Continued)

*Primary Examiner* — Kelly M Gambetta
*Assistant Examiner* — Virak Nguon
(74) *Attorney, Agent, or Firm* — Fredrikson & Byron, P.A.

(57) ABSTRACT

In a method for manufacturing articles in the form of a slab or block, the articles are obtained from an initial mix comprising aggregates and a binder. Synthetic aggregates and fillers have a hardness greater than or equal to 5 Mohs, and contain silicon dioxide substantially only in amorphous form, the silicon dioxide in crystalline form being present in quantities of less than 1% by weight.

14 Claims, No Drawings

(56) References Cited

OTHER PUBLICATIONS

Laguna Clay Company, Ferro Corporation, 3134-2 Milled Glaze Frit 50 LB Bag Material Safety Data Sheet, Oct. 25, 2011, 5 pages.
Leadless and low alumina high calcia borosilicate frit, Ferro Frit 3134, Ceramic Materials, Digitalfire Reference Database, Aug. 10, 2016, 5 pages.
Ming-Yu Lee, etc., Artificial stone slab production using waste glass, stone fragments and vacuum vibratory compaction, Cement & Concrete Composites 30 (2008), 583-587, 1 page.
Wikipedia, Soda-lime glass, Apr. 16, 2017, 4 pages.
Encyclopaedia of Occupational Health and Safety, Fourth Edition, Glass, Glass, Ceramics and Related Materials, 1998, 3 pages.
Hanwha L&C/Surfaces and Hansstone Quartz, Understanding the art of Quartz, 62 pages.
Third Party Observation for Application No. EP20180721857. Took place on Feb. 9, 2022, 12 pages.

\* cited by examiner

METHOD FOR MANUFACTURING ARTICLES IN THE FORM OF A SLAB OR BLOCK WITH A HARDENING BINDER, AND ARTICLES THUS OBTAINED

RELATED APPLICATIONS

This application is a 35 U.S.C. 371 national stage filing from International Application No. PCT/IB2018/052483, filed Apr. 10, 2018, which claims priority to Italian Application No. 102018000003001, filed Feb. 23, 2018, and Italian Application No. 102017000040155, filed Apr. 11, 2017, the teachings of which are incorporated herein by reference.

The present invention relates to a method for manufacturing articles in the form of a slab or block with a hardening binder, and to the articles thus obtained.

In particular, the present invention relates to a method for manufacturing articles in slab or block form in which the initial mix consists of granules of stone or stone-like material with a predetermined particle size and an organic and/or inorganic hardening binder.

It is known to produce this type of article for example by means of rolling, pressing, extrusion or by means of the BRETONSTONE® process.

Rolling is used for example during the manufacture of ceramic slabs or resin slabs containing mineral fillers such as aluminium hydroxide or calcium carbonate. In this process, the mix to be compacted is for example distributed on top of a conveyor belt which may be made of steel and is then crushed by one or more steel cylinders which are subject to a pressing force from above of the hydraulic or pneumatic type.

Pressing is used for example for the manufacture of ceramic slabs. In this process, the mix to be compacted is distributed on top of a support, for example a conveyor belt, and then crushed by a press ram which has a surface area slightly greater than the article to be obtained.

Extrusion is used for the manufacture of ceramic slabs or resin slabs containing mineral fillers such as aluminium hydroxide or calcium carbonate. The mix to be formed is extruded through a die which has the shape of the cross-section of the slab, being pushed by a screw-pressing or hydraulic pressure system. Downstream of the die, the extruded article rests for example on a conveyor belt.

As regards the BRETONSTONE® system, a mix consisting of stone material aggregates and a binder is poured into a temporary holder and subjected to vibration with simultaneous compression under a vacuum (vacuum vibro-compression).

An essential part of this process is vacuum vibro-compression which allows the possibility of using a minimum amount of binder and consequently the maximum amount of stone or stone-like aggregates, obtaining a slab with a very natural appearance.

With this process it is possible to obtain slabs having dimensions also as large as 2.1 m×3.6 m and a thickness which may be as much as 30 mm or more.

Considering the possible ingredients of the initial mix, these may comprise aggregates, fillers, binders, additives and colouring agents.

The aggregates normally consist of natural minerals which may be of a siliceous nature, such as quartz, granites, porphyry, basalt, quartzite, silica sands, or of a calcareous nature, such as marbles, dolomite, coloured stones, etc.

These materials may be used in the form of sands or granulates of different dimensions, depending on the aesthetic and physical/mechanical characteristics which are to be obtained in the end products.

Sometimes, for aesthetic reasons, the formulations may also include coloured-glass granules, even though they are not very scratch-resistant having a Mohs hardness normally not greater than 4, or other decorative elements such as crushed shells. Sometimes glass granulates are also used in high percentages in order to obtain special aesthetic effects, even though articles which have a poor scratch or abrasion resistance are obtained.

Mineral fillers are materials which are used together with the binder to form the so-called binding paste. Fillers normally consist of stone materials of different kind which are finely ground, such as aerated silica or aerated feldspar for agglomerates formed with siliceous aggregates, and calcium carbonate or aluminium hydroxide for agglomerates formed with calcareous aggregates.

Articles made using as aggregate and filler quartz ground respectively into sand or fine powder have become commercially widespread. Owing to the transparency of quartz, it is possible to produce, with the suitable addition of coloured pigments, articles with a high-quality appearance which are very resistant to scratching/abrasion and chemical agents such as commonly used acids (citric acid contained in lemon juice, acetic acid, which is a component of vinegar, etc.).

The binder of an organic nature which is commonly used is a resin, for example a non-saturated polyester resin, or an acrylic or acrylic/urethane resin or also resins of vegetable origin such as seed oils epoxidized with anhydrides.

Alternatively it is possible to use a binder of a cementitious nature.

As well-known to the person skilled in the art, in the case of a resin, hardening is preferably performed by applying heat inside an oven, while in the case of a cementitious binder it is required to perform curing of the slab.

The additives are components which are added in small quantities to the mixes in order to obtain given results, such as catalysts and accelerators for hardening the resin or the coloured pigments.

Methods of this type are described in Italian patents Nos. 1117346 and 1056388.

The prior art, although widely used and appreciated, is not without drawbacks.

One particularly troublesome drawback arises from the use, as aggregates and fillers, of materials such as quartz or quartzite or silica sands or more generally the use of materials which during machining of the end article, such as cutting of the slab, give rise to the formation of silicon dioxide ($SiO_2$) dust in the crystalline state.

This dust, when dispersed into the atmosphere, may be very harmful for human health if inhaled, causing a pulmonary disease called silicosis.

This problem is well-known to the person skilled in the art and normally the person performing machining should wear personal protection devices designed to prevent inhalation of the dust.

The problem, however, does not arise if, during machining, for example cutting or shaping, water is conveyed into the zone of contact between tool and material since this prevents the propagation into the air of the harmful substances in the form of dust.

However, these two precautionary conditions (use of personal protection devices and/or spraying of the machining zone with water) are not always respected and therefore there exists the need to produce upstream an end product which has the desired mechanical and/or chromatic properties, but which completely avoids the generation of substances which are harmful for the operators and thereby the consequences of incorrect behaviour which could result in serious damage to their health.

The object of the present invention is to solve at least partially the drawbacks of the prior art, in connection with the widespread industrial use of quartz as an aggregate and filler.

A first task of the present invention is therefore to provide a method for manufacturing articles which are made without using quartz, but which have characteristics in terms of appearance and performance similar to those of products which contain quartz and which do not give rise to crystalline silicon dioxide dust during machining operations.

A second task of the present invention is to provide an article made without using quartz, but which has characteristics in terms of appearance and performance similar to those of products which contain quartz and which does not give rise to crystalline silicon dioxide dust during machining operations.

The object and tasks are achieved with the use of aggregates according to claim 1, with a method according to claim 10 and with an article according to claim 25.

The advantages and characteristic features of the present invention will emerge more clearly from the detailed description below of a number of examples of embodiment provided by way of a non-limiting example.

In particular, the idea which has occurred is to use synthetic aggregates and fillers which are very hard and semi-transparent or whitish, with an appearance similar to quartz, but which contain silicon dioxide substantially only in amorphous form in a method for manufacturing articles in slab or block form, instead of aggregates and/or fillers which are obtained from the grinding of quartz and which, during machining operations such as cutting, could cause the aforementioned problems.

Essentially, the idea which has occurred is to use synthetic aggregates and fillers which are very hard and semi-transparent or whitish, with an appearance similar to quartz, but comprising silicon dioxide substantially only in amorphous form instead of quartz which during the (slab or block) machining process would produce crystalline silicon dioxide dust.

The synthetic aggregate and filler containing silicon dioxide substantially only in amorphous form may be a special amorphous glass, called "frit" in technical jargon, which is very hard and semi-transparent or whitish, with an appearance similar to quartz; traces of silicon dioxide in crystalline form could be present, but in any case in amounts less than 1% by weight.

A frit with these characteristics may be obtained by melting at about 1550° C. a mixture of selected natural mineral powders. The molten material output from the melting furnace is struck directly by a water jet for quick cooling, then dried, ground and separated into the desired granulometric fractions.

The thinner granulometric fractions are used as fillers.

In accordance with a possible embodiment of the present invention, the synthetic aggregate and filler with hardness ≥5 Mohs containing silicon dioxide substantially only in amorphous form may form at least 70% by weight of the aggregates and filler of the initial mix.

Advantageously, the synthetic aggregate and filler with hardness ≥5 Mohs containing silicon dioxide substantially only in amorphous form may form between 70% and 100% by weight of the aggregates and filler of the initial mix.

Advantageously, the glass frit with hardness ≥5 Mohs used may have the following chemical composition:
48%<$SiO_2$<73%,
12%<$CaO$<30%,
1.5%<$MgO$<11%,
1.0%<$Al_2O_3$<19%, and
0%<$ZrO_2$<20%.

Or the glass frit with hardness ≥5 Mohs used may have the following chemical composition:
43%<$SiO_2$<80%,
5%<$CaO$<30%,
0%<$MgO$<12%,
0%<$Al_2O_3$<25%, and
0%<$ZrO_2$<20%,
0%<$Na_2O$<12%,
0%<$K_2$<10%.

Optionally the frit may also contain the following further components:
0%<$B_2O_3$<10%
%<$ZnO$<10%
0%<$BaO$<10%
0%<$Li_2O$<5%
0%<$P_2O_5$<5%

Advantageously the frit with hardness ≥5 Mohs may have a colour which has a high degree of whiteness (with L>95) or is translucent. These colours are similar to those of quartz which is used in the initial mixes of the known type.

For this purpose the quantities of cromophores must be particularly low so that the aforementioned chemical composition may further comprise:
$Fe_2O_3$<0.1%; and
$TiO_2$<0.1%.

The hardness of the frit granules may be preferably greater than 5 Mohs and even more preferably greater than 6 Mohs.

The frit used is moreover resistant to acids (except for hydrofluoric acid) and has a good resistance to strong bases. Moreover, it is characterized by a total chemical inertia and by complete water insolubility, even in hot conditions, without the need for further heat treatment. Advantageously there is no release of any metals which may be present.

Moreover, the frit used has a good yield during grinding with a limited tendency to produce dust or flakes when ground.

It is particularly advantageous to keep the mix paste-like. According to a possible embodiment of the present invention the binding resin consists of an amount equal to less than 30% by weight.

The other steps of the method for manufacturing the article remain substantially the same as in the prior art.

As regards rolling, after the mix has been prepared, it is distributed widthwise on top of a conveyor belt so that its upper surface may be subject to the pressing action of at least one cylinder. The pressing action may be provided by hydraulic or pneumatic means.

In a possible variation of this process, the mix once distributed on the conveyor belt may be compacted by a second pressing belt, opposite to the first belt and synchronized with it, subject to a crushing action.

Advantageously, in a manner known per se to the person skilled in the art, separating sheets of anti-adhesive material may be inserted between belt and mix and between mix and the at least one pressing cylinder (or belt).

In the case where the mix is used in a pressing process, the mix is distributed widthwise on top of a support, for example a conveyor belt, and is then subjected to a pressing action by a press ram. Advantageously the press ram may have a surface area greater than that of the article to be obtained. In accordance with a possible embodiment of the present invention, the pressing force is produced by hydraulic means.

Advantageously, separating sheets of anti-adhesive material may be arranged between belt and mix and between press ram and mix.

As regards extrusion, the prepared mix is extruded through a die having the shape of the cross-section of the slab. The apparatus also comprises a pressing element which may be for example of the screw or hydraulic type. In accordance with a possible embodiment, once the article has been extruded, it rests for example on a conveyor belt, a film of anti-adhesive material being where necessary arranged in between.

In the case instead of the BRETONSTONE® process, after the initial mix has been prepared, it is deposited inside a temporary holder, which may be a so-called tray mould (in the case of a slab) or a formwork (in the case of a block).

Then the surface of the mix may be covered with a sheet of material which is similar to that forming the tray mould, or a lid in the case of a formwork for the production of blocks.

The holder containing the mix is then inserted inside a bell inside which the vacuum is created and the mix is subjected via a press ram to vacuum vibro-compression.

Advantageously the vacuum created may have a residual pressure of between 10 and 25 mbar.

Advantageously the vacuum vibro-compression may last between 30 and 70 seconds.

Once the vibro-compression operation has been completed, the atmospheric pressure is restored and the bell is opened.

The slab which may be obtained by means any one of the methods described above is then transferred into a catalysis oven, in the case where resin is used as a binder, or is left to cure in the case where a cementitious binder is used.

Once the article has hardened, it is extracted as required from the holder and is conveyed away for the finishing operations.

The advantages which may be obtained compared to the conventional methods for manufacturing articles in the form of slabs or blocks according to the prior art are therefore evident.

Firstly, it is possible to produce articles with a high-quality appearance and resistance to scratching and chemical agents which, during machining operations, such as cutting, do not result in the formation of silicon dioxide dust in crystalline form.

Secondly, by preventing the formation of this component, it is possible to avoid beforehand the consequences of any incorrect behaviour of operators during the machining operations.

Moreover, it is possible to obtain a slab with aesthetic, mechanical and performance characteristics very similar to those achieved with quartz, which at present are very widespread and popular on the market.

The person skilled in the art, in order to satisfy specific needs, may make modifications to the embodiments described above and/or replace the elements described with equivalent elements, without thereby departing from the scope of the attached claims.

The invention claimed is:

1. A method for manufacturing articles in the form of a slab or block, said articles being obtained from an initial mix comprising aggregates and a binder, characterized in that the initial mix comprises stone-like synthetic aggregates and fillers with a hardness greater than or equal to 5 Mohs, which contain silicon dioxide substantially only in amorphous form while any case of silicon dioxide in crystalline form being present in quantities of less than 1% by weight; and
wherein the synthetic aggregates and fillers have the following chemical composition:
43%<$SiO_2$<80%,
5%<$CaO$<30%,
0%<$MgO$<12%,
0%<$Al_2O_3$<25%,
0%<$ZrO_2$<20%,
0%<$Na_2O$ <12%, and
0%<$K_2O$ <10%;
the $SiO_2$ being present substantially only in amorphous form while any case of the $SiO_2$ in crystalline form being present in quantities of less than 1% by weight; and
wherein the initial mix undergoes vacuum vibro-compression followed by a binder hardening step.

2. The method according to claim 1, characterized in that the initial mix is subjected to a rolling process in which the mix is distributed widthwise on top of a conveyor belt so that an upper surface of the mix is configured to be subjected to a pressing action by a cylinder or by a second synchronized belt situated opposite the conveyor belt.

3. The method according to claim 1, characterized in that the mix is subjected to a pressing process in which the mix is distributed widthwise on top of a support and then subjected to a pressing action by a press ram.

4. The method according to claim 1, characterized in that the mix is subjected to an extrusion process through a die having a same shape as a cross-section of the slab.

5. The method according to claim 1, characterized in that at least 70% by weight of the aggregates and fillers consists of synthetic aggregates and fillers with a hardness greater than or equal to 5 Mohs, which contain silicon dioxide substantially only in amorphous form.

6. The method according to claim 1, characterized in that said synthetic aggregates and fillers form between 70% and 100% by weight of the aggregates and fillers of the initial mix.

7. The method according to claim 1, characterized in that the chemical composition of the synthetic aggregates and fillers also comprises the following further components:
0%<$B2O3$<10%,
0%<$ZnO$<10%,
0%<$BaO$<10%,
0%<$Li2O$<5%, and
0%<$P2O5$<5%.

8. The method according to claim 7, characterized in that the chemical composition also comprises $Fe_2O_3$<0.1% and $TiO_2$<0.1%.

9. The method according to claim 1, characterized in that the chemical composition also comprises Fe2O3<0.1% and TiO2<0.1%.

10. The method according to claim 1, characterized in that the binder used is of an organic nature.

11. The method according to claim 10, characterized in that the organic binder used is an unsaturated polyester resin.

12. The method according to claim 11, characterized in that an amount of the resin used is equal to less than 30% by weight.

13. The method according to claim 1, characterized in that the binder is of a cementitious nature.

14. An article in the form of a slab or block obtained from an initial mix comprising aggregates and a binder, characterized in that the initial mix comprises stone-like synthetic aggregates and fillers with a hardness greater than or equal to 5 Mohs, which contain silicon dioxide substantially only in amorphous form while any case of silicon dioxide in crystalline form being present in quantities of less than 1% by weight; and wherein the synthetic aggregates and fillers have the following chemical composition:
$43\% < SiO_2 < 80\%$,
$5\% < CaO < 30\%$,
$0\% < MgO < 12\%$,
$0\% < Al_2O_3 < 25\%$,
$0\% < ZrO_2 < 20\%$,
$0\% < Na_2O < 12\%$, and
$0\% < K_2O < 10\%$;

the $SiO_2$ being present substantially only in amorphous form while any case of the $SiO_2$ in crystalline form being present in quantities of less than 1% by weight.

* * * * *